F. NORMAN.
ACETYLENE GENERATOR.
APPLICATION FILED MAR. 31, 1916.
1,274,753.
Patented Aug. 6, 1918.
3 SHEETS—SHEET 3.
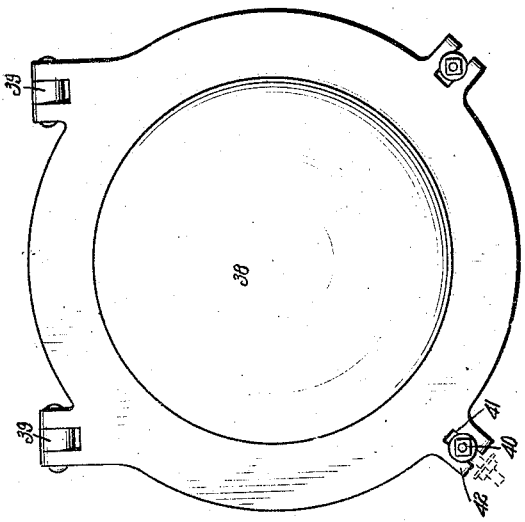
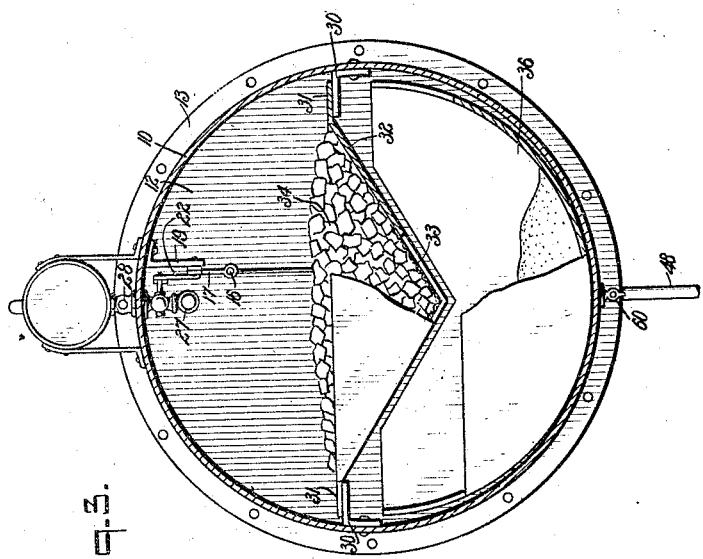
WITNESSES
INVENTOR
Frank Norman
BY
ATTORNEYS

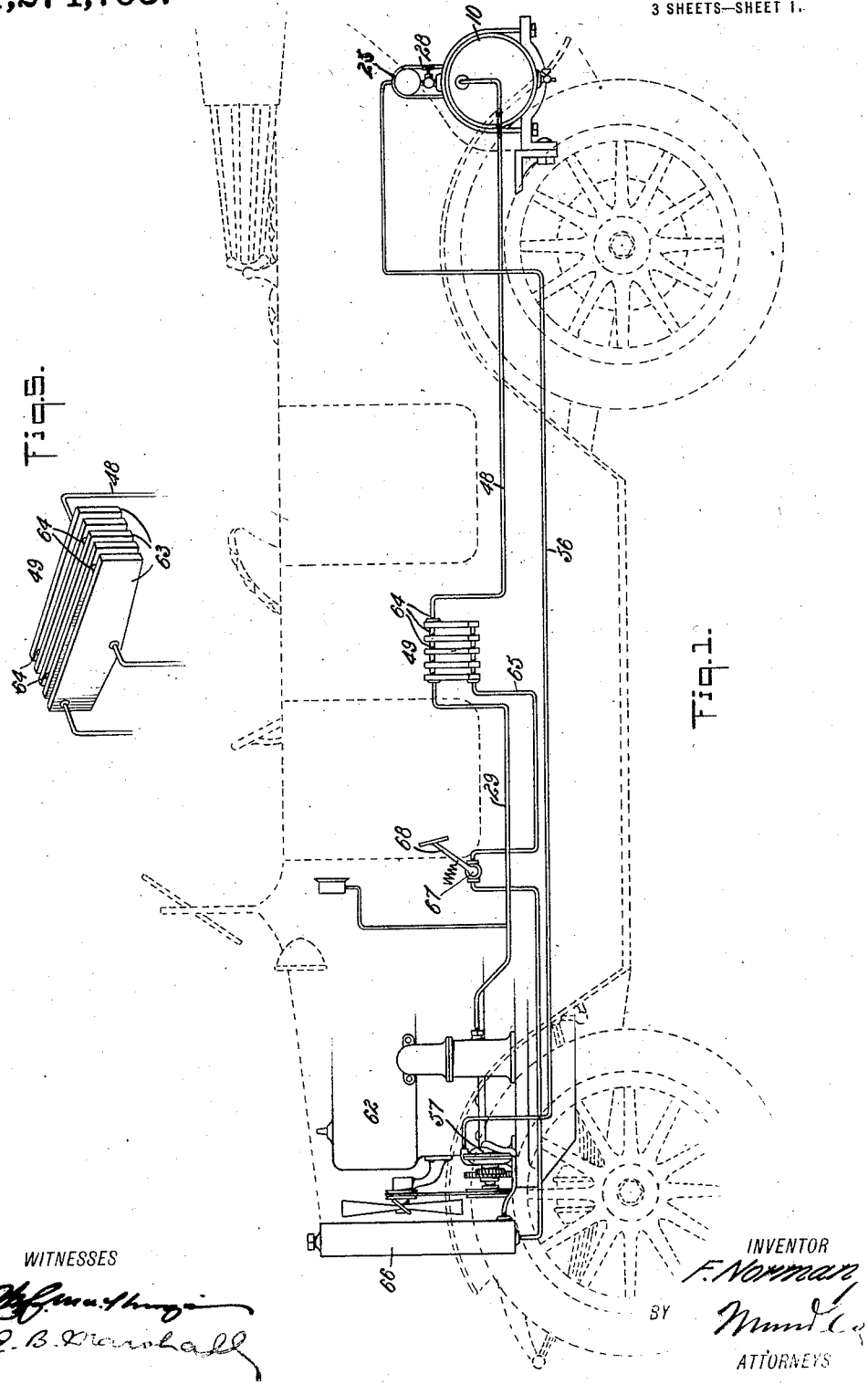

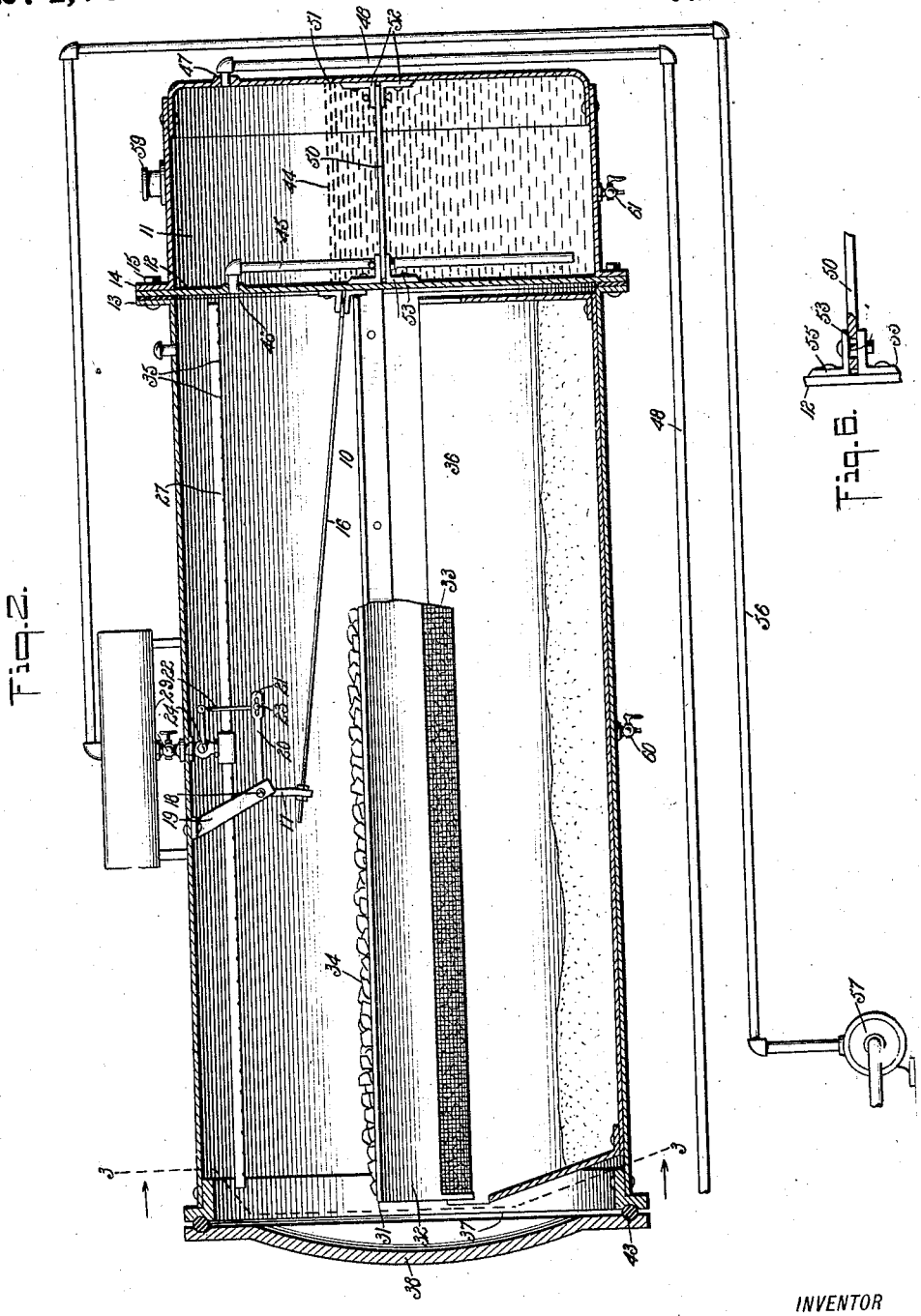

UNITED STATES PATENT OFFICE.

FRANK NORMAN, OF DES MOINES, IOWA, ASSIGNOR OF EIGHT THIRTY-SECONDS TO DOUGLAS J. LANDERS, SEVEN THIRTY-SECONDS TO WILLIAM A. McATEE, FOUR THIRTY-SECONDS TO ALPHONSO B. LOVAN, TWO THIRTY-SECONDS TO GEORGE W. YOUNG, AND ONE THIRTY-SECOND TO WILLIAM T. SHORES, ALL OF SPRINGFIELD, MISSOURI, AND TWO THIRTY-SECONDS TO CLARENCE H. NICHOLS, OF NEW YORK, N. Y.

ACETYLENE-GENERATOR.

1,274,753.　　　Specification of Letters Patent.　　Patented Aug. 6, 1918.

Application filed March 31, 1916. Serial No. 87,960.

*To all whom it may concern:*

Be it known that I, FRANK NORMAN, a citizen of the United States, and a resident of Des Moines, in the county of Polk and State of Iowa, have invented a new and Improved Acetylene-Generator, of which the following is a full, clear, and exact description.

This invention relates to acetylene gas generators.

The object of the invention is to provide an acetylene gas generating system for automobiles and other vehicles comprising in combination with the engine of the vehicle an acetylene gas generator, mechanism driven by the engine for forcing water into the generator, a passage for conducting the gas to the engine, and a combined radiator and equalizer in and constituting a part of the passage and arranged to receive and cool the gas and to equalize the pressure thereof toward the engine, irrespective of the variations in the supply of the gas or the pressure therefrom from the generator resulting incidentally to the vibration of the vehicle, or other causes incidental to the use of the device.

Other objects of the invention will appear from the following description, reference being made to the accompanying drawings, illustrating a preferred embodiment of the invention, in which—

Figure 1 is a diagrammatic view of the device applied to an automobile.

Fig. 2 is a longitudinal sectional view of the acetylene gas generator.

Fig. 3 is a cross sectional view on the line 3—3 of Fig. 2.

Fig. 4 is an end elevation of the generator.

Fig. 5 is a perspective view of the combined radiator and equalizer mounted in and constituting a part of the passage for conducting the gas to the engine and arranged to effect the operation of the gas generator, so that the pressure of the gas toward the engine will be equalized under the varying conditions.

Fig. 6 is a fragmentary sectional view of a link or bar which limits movement of the expansible end or head of the generating tank.

The generator tank 10 is preferably cylindrical in form and supports a water chamber or condenser 11 separated from the generating tank by an expansible partition or end wall 12. This partition is secured between the flange 13 on the generating tank and the flange 14 on the condenser 11, the parts being held in the position described by bolts 15 passing through the flanges and the expansible partition. The partition 12 yields or expands outwardly under an increase of pressure in the generating tank 10 and in order to limit such movement I provide a link 50, one end of which is connected to brackets 52 attached to the end wall 51 of the condenser. The opposite end of the link is supported between the brackets 55 on the expansible partition wall and is connected to the brackets by a pin 54 passing through the brackets and through a slot 53 in the link. Thus the movement of the partition in either direction is limited by the length of the slot in the link 50.

Supporting brackets 30 are attached to the sides of the generating tank 10 for supporting the flanges 31 which are in connection with a carbid pan or basket 32, the walls of which are oppositely inclined so that the carbid therein will be directed to the V-shaped bottom of the basket. The lower portion of the basket is in the form of a screen 33, whereas the upper portions of the walls of the basket are smooth in order to feed the carbid onto the screen. As a result of this construction the vibration of the generating tank incidentally to the movement of the automobile or vehicle will shake or agitate the carbid 34 so that it will move upon the screen in position to receive the water applied as presently described. Below the carbid basket is an ash pan 36 for receiving the ashes passing through the screen 33. The basket 32 and the ash pan 36 are removable through the end 37 of the generating tank. The end 37 is normally closed by a removable head or closure 38 which is connected to the tank at one side by hinges 39 and held in closed position by bolts 40 pivoted to the generator and engaging in slots 41 formed in projecting ears 42 integral with the head or closure. In order to form a hermetic joint a gasket 43 is applied between the head and the end of the generating tank.

In the embodiment illustrated water is supplied to the generating tank from a water tank 25 supported adjacent to the generating tank. A pipe 26 constitutes a passage for conducting the water from the water tank into the generating tank, and said pipe discharges into a pipe supported longitudinally in a horizontal position above the carbid tank and provided with openings 35 through which the water is sprayed onto the carbid. The pipe 26 is equipped with a manipulative valve 28 by which the flow of the water from the tank 25 may be regulated in order to prevent or vary the flow of the water as circumstances may require. In addition to the valve 28, the pipe 26 is provided with a valve 24 within the generating tank. One end of a link 22 is connected to the lever of the valve 24 and the opposite end of the link 22 has a projection 23 extending into a slot 21 in the arm 20 of the bell crank lever. The bell crank lever of which the arm 20 is a part is supported upon a pivot 18 on an arm 19 attached to and depending from the wall of the generating tank. The other arm 17 of the bell crank lever extends downwardly and is connected by a link 16 with the expansible partition 12. By these connections the valve 24 will be operated to close the pipe 26 in order to stop the flow of the water when the pressure of the gas within the generating tank rises to such an extent that the expansible partition 12 is pressed outwardly to draw the link 16 therewith.

In the normal position of the expansible partition, when the pressure of the gas within the generating tank is below the desired maximum, the link 16 is held in position to retain the valve 24 open, so that there may be constant flow of water through the pipe 26 into the sprinkler pipe 27. However, as stated, the flow of the water may be varied or prevented as desired by the valve 28.

The condenser or water chamber 11 may be filled with water through an opening provided with a removable closure 59. The gas from the generating tank passes into a pipe 46 opening through the expansible partition 12, and thence into a depending pipe 45 extending into the water in the condenser to a point near the bottom thereof, so that the gas passing through the pipes 46 and 45 will be discharged into the water and cleansed and cooled thereby. Service pipe connections communicate with the condenser above the level of the water therein and constitute passages for conducting the gas to the engine. These service pipe connections include the section 47 opening into the condenser and the pipe 48 leading toward the engine.

The pipe 48 opens into a radiator and equalizer 49 comprising a series of expansible chambers 63. The chambers 63 of the series are connected at alternately opposite ends by pipes 64, so that the gas is required to pass through the entire length of each chamber before entering the next adjacent one of the series. The radiator is expansible as stated and receives a considerable quantity of the gas, so that the pressure of the gas toward the engine is equalized and maintained substantially uniform under varying conditions and under variations in the gas pressure from the generating tank. The radiator is of relatively large area and therefore gives considerable radiation so that the gas is cooled and reduced to the proper temperature for delivery to the engine. A continuation of the pipe 48 leads from the last one of the series of chambers 63 to the manifold of the engine. A pipe 65 leads from the radiator 49 to the engine radiator 66 and is controlled by a normally closed valve 67 operable by means of a lever 68 so that when there is any accumulation of water in the radiator 49, the valve 67 may be opened to permit the gas pressure to eject the water through the pipe 65 into the engine radiator.

In the embodiment illustrated the water tank 25 is connected with the engine radiator 66 by a pipe 56, so that the usual pump 57 for circulating the water in the water jacket of the engine will also force a supply of water through the pipe 56 into the water tank 25.

For well understood purposes the generating tank 10 is provided with a valve controlled discharge outlet 60 and the water chamber or condenser 11 is provided with a valve controlled drain outlet 61.

From the foregoing description it will be understood that the water is forced from the tank 25 into the generating tank 10 by means of the pump driven by the engine and that when the gas pressure in the generating tank exceeds the desired maximum, the flow of the water will be automatically stopped by the valve 24 which is closed by outward movement of the expansible partition 12. The gas is taken from the generating tank through the pipe 46—45 and is cooled and washed in the water in the water chamber or condenser 11. From the condenser 11 the water is taken through the service pipe 47—48 to the radiator and equalizer 49 and is discharged therefrom to the engine. The water of condensation may be discharged from the equalizer through the pipe 65.

What I claim and desire to secure by Letters Patent of the United States, is:—

1. The combination with an engine, of an acetylene gas generator, a device operated by the engine for forcing water into the generator, means for supplying the engine with gas from the generator, and means controlled by the pressure of the gas in the generator for preventing the flow of water into the generator, when the gas pressure reaches a predetermined limit, and while said device continues in operation.

2. The combination with an engine, of an acetylene gas generator, a device operated by the engine for forcing water into the generator, means controlled by the pressure of the gas in the generator for preventing the flow of water into the generator when the gas pressure reaches a predetermined limit and while said device continues in operation, a passage connecting the gas generator with the engine, and a device in said passage for modifying the pressure of the gas from the generator to equalize the pressure of the gas toward the engine under varying pressures of the gas in the generator.

3. The combination with an engine and an engine radiator, of an acetylene gas generator, a device operated by the engine for forcing water from the engine radiator into the generator, a passage for conducting the gas from the generator to the engine, a passage for conducting condensation of moisture from said gas passage into the engine radiator, and a valve controlling said last-named passage.

FRANK NORMAN.

Witnesses:
JOHN H. FAIRMAN,
FRANK P. MCATEE.